US005728971A

United States Patent [19]

Nash

[11] Patent Number: 5,728,971
[45] Date of Patent: Mar. 17, 1998

[54] ELECTRIC OUTLET BOX AND CONNECTOR ASSEMBLY

[76] Inventor: William L. Nash, 4069 NE. 8th Ave., Oakland Park, Fla. 33334

[21] Appl. No.: 686,206

[22] Filed: Jul. 23, 1996

[51] Int. Cl.$^6$ ..................................................... H02G 3/18
[52] U.S. Cl. ................................. 174/50.52; 174/59
[58] Field of Search ....................... 174/50, 59, 60, 174/65 R, 50.52, 50.53; 220/242, 3.8, 4.02

[56] References Cited

U.S. PATENT DOCUMENTS

| | | | |
|---|---|---|---|
| 3,800,015 | 3/1974 | Sachs | 264/45 |
| 4,198,537 | 4/1980 | Mariani | 174/65 R |
| 5,204,499 | 4/1993 | Favalora | 174/65 R |
| 5,285,013 | 2/1994 | Schnell et al. | 174/65 R |
| 5,373,106 | 12/1994 | O'Neil et al. | 174/65 R |
| 5,486,650 | 1/1996 | Yetter | 174/53 |

FOREIGN PATENT DOCUMENTS 748277  4/1956  United Kingdom .

Primary Examiner—Kristine L. Kincaid
Assistant Examiner—Dhiru R. Patel
Attorney, Agent, or Firm—Herbert L. Lerner; Laurence A. Greenberg

[57] ABSTRACT

An electrical outlet box and connector assembly includes an outlet box housing having a plurality of cavities formed therein. A connector has a one-piece fastener for immobilizing the connector with the connector mounted in one of the cavities. A method for connecting electrical metallic tubing (EMT) to an electrical outlet box includes the steps of attaching a connector having a one-piece fastener to a piece of EMT for securing the connector to the piece of EMT. The one-piece fastener of the connector is mounted to an outlet box housing, having a plurality of cavities, in one motion for immobilizing the connector.

11 Claims, 5 Drawing Sheets

ELECTRIC OUTLET BOX AND CONNECTOR ASSEMBLY

BACKGROUND OF THE INVENTION

1. Field of the Invention

The invention relates to an outlet box and connector assembly for electrical outlets, and to a method for connecting electrical metallic tubing (EMT) to the outlet box. The outlet box is mounted on masonry walls (e.g. concrete) between furring strips for mounting thereon drywall or sheetrock. The box, at its lateral openings, receives EMT in which the electrical conductor resides.

2. Description of the Related Art

Standard outlet boxes which are currently available in commerce are a minimum of 1½ to 2" (3.9–5.2 cm) deep and receive EMT via a circular entry created by the removal of a knock-out. Furring strips, which define the distance between the concrete wall and the wall finish (e.g. drywall), generally have a thickness of only ¾" (1.9 cm). Accordingly, it is necessary to chisel recesses or holes into the concrete structure, so as to allow proper placement of the outlet box and to provide a recessed path for the EMT such that the EMT is aligned with the knock-outs of the outlet box.

The object of the prior art device is to align the outer flange of the outlet box with the outer surface of the furring strip. A raised mud ring plate is then placed on the outlet box to provide a device mounting capability which is flush with the wall finish (e.g. drywall). After the box has been properly mounted, the concrete wall is patched around the box to fill the void in the concrete block.

The EMT, which gets connected to the outlet box, must be specifically bent to accommodate the contour of the modified masonry structure in its path to the outlet box. This EMT bending process adds time and expense to the wiring of masonry type structures.

The time required to connect the EMT to the outlet box is a cost factor to the electrical contractor. The quicker and easier it is to install and connect a particular outlet box, the more desirable that outlet box is to the electrical contractor. The prior art requires the electrician to remove a rounded knock-out from the standard outlet box and this provides a circular entry into the standard outlet box for the EMT. After removing the rounded knock-out, the electrician would affix onto the end of the EMT a connector with a threaded ending. The EMT with the end holding the connector would then be entered into the outlet box through the circular entry. The electrician then fastens a retainer (e.g. lock nut), larger in dimension than the circular entry of the outlet box, to the threaded connector ending. This prevents the EMT from exiting the outlet box. The time required to attach the lock nut to the connector now housed in the outlet box is another disadvantage of the prior art. In the prior art, the lock nut is greater than ¾" in diameter and this alone causes an incompatibility with the ¾" furring strip.

U.S. Pat. No. 5,378,854 to Hoover discloses a plastic outlet box. The outlet box taught by Hoover is a box for attachment to a stud, which is deeper than furring strips. If utilized in the context of furred walls, the Hoover box is so deep as to require the above-described chipping of a void in the concrete wall. In addition, the knock-outs are not constructed to receive EMT and can only receive an electrical conductor (e.g. ROMEX).

U.S. Pat. No. 4,135,337 to Medlin discloses another example of an outlet box. The outlet box taught by Medlin is a box for attachment to a metal stud, which is deeper than furring strips. If utilized in the context of furred walls, the Medlin box is so deep as to require the above-described chipping of a void in the concrete wall. The Medlin box is compatible with EMT but requires the fastening of a lock nut to secure the EMT to the outlet box. In the instant application, this step is eliminated.

SUMMARY OF THE INVENTION

It is accordingly the object of the invention to provide an electrical outlet box and connector assembly, and a method for connecting EMT to the outlet box, which overcome the herein-mentioned disadvantages of the heretofore-known devices and methods of this general type, which makes it possible to avoid breaking out concrete block, and makes it quicker and easier to attach EMT to the electrical outlet box.

With the foregoing and other objects in view there is provided, in accordance with the invention, an electrical outlet box and connector assembly, comprising an outlet box housing having a plurality of cavities formed therein; and a connector having a one-piece fastener for immobilizing the connector with the connector mounted in one of the cavities.

In accordance with an added feature of the invention, the outlet box housing has a wall finishing support top and a side wall, and the cavity is formed of a slot in the wall finishing support top and a slot in the side wall into which the connector is slid.

In accordance with an additional feature of the invention, the outlet box housing has a wall finishing support top, a side wall and a back plate, and the cavity is formed of a slot in the wall finishing support top, a slot in the side wall and a slot in the back plate, into which the connector is slid.

In accordance with another feature of the invention, there are a plurality of removable knock-outs mounted on the outlet box housing and covering the cavities.

In accordance with a concomitant feature of the invention, the knock-outs are rectangle-like in shape.

In accordance with an added feature of the invention, the connector has a plurality of indented dogs for securing the connector to the EMT.

In accordance with an additional feature of the invention, the indented dogs are made from heat treated spring steel for gripping EMT.

In accordance with another feature of the invention, the fastener has a flange for securing the connector to the outlet box housing.

In accordance with a concomitant feature of the invention, the fastener has a chamber bordered by the flange for receiving a portion of the outlet box housing.

In accordance with an added feature of the invention, the flange is made from heat treated spring steel for gripping the outlet box housing.

In accordance with an additional feature of the invention, the flange has rounded edges for facilitating entry of the connector into the cavity.

In accordance with another feature of the invention, the outlet box housing has a given depth corresponding to a sum of a thickness of a furring strip and of a wall finishing sheet for facilitating installation of the wall finishing sheet and the outlet box housing placed between the furring strips on a masonry wall.

With the foregoing and other objects in view there is provided, in accordance with the invention, a method for connecting EMT to an electrical outlet box, comprising the steps of attaching a connector having a one-piece fastener to a piece of EMT for securing the connector to the piece of EMT; and mounting the one-piece fastener of the connector to an outlet box housing, having a plurality of cavities, in one motion for immobilizing the connector.

In accordance with an added mode of the invention, there is provided a method which comprises carrying out step of mounting the one-piece fastener by sliding the one-piece fastener of the connector into one of the cavities of the outlet box housing for wedging the one-piece fastener of the connector to the outlet box housing.

The invention is illustrated with a one gang electrical outlet box. The invention is applicable to an electrical outlet box containing multiple gangs.

Other features which are considered as characteristic for the invention are set forth in the appended claims.

Although the invention is illustrated and described herein as embodied in an electrical outlet box and connector assembly for electrical outlets, and to a method for connecting EMT to the outlet box, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
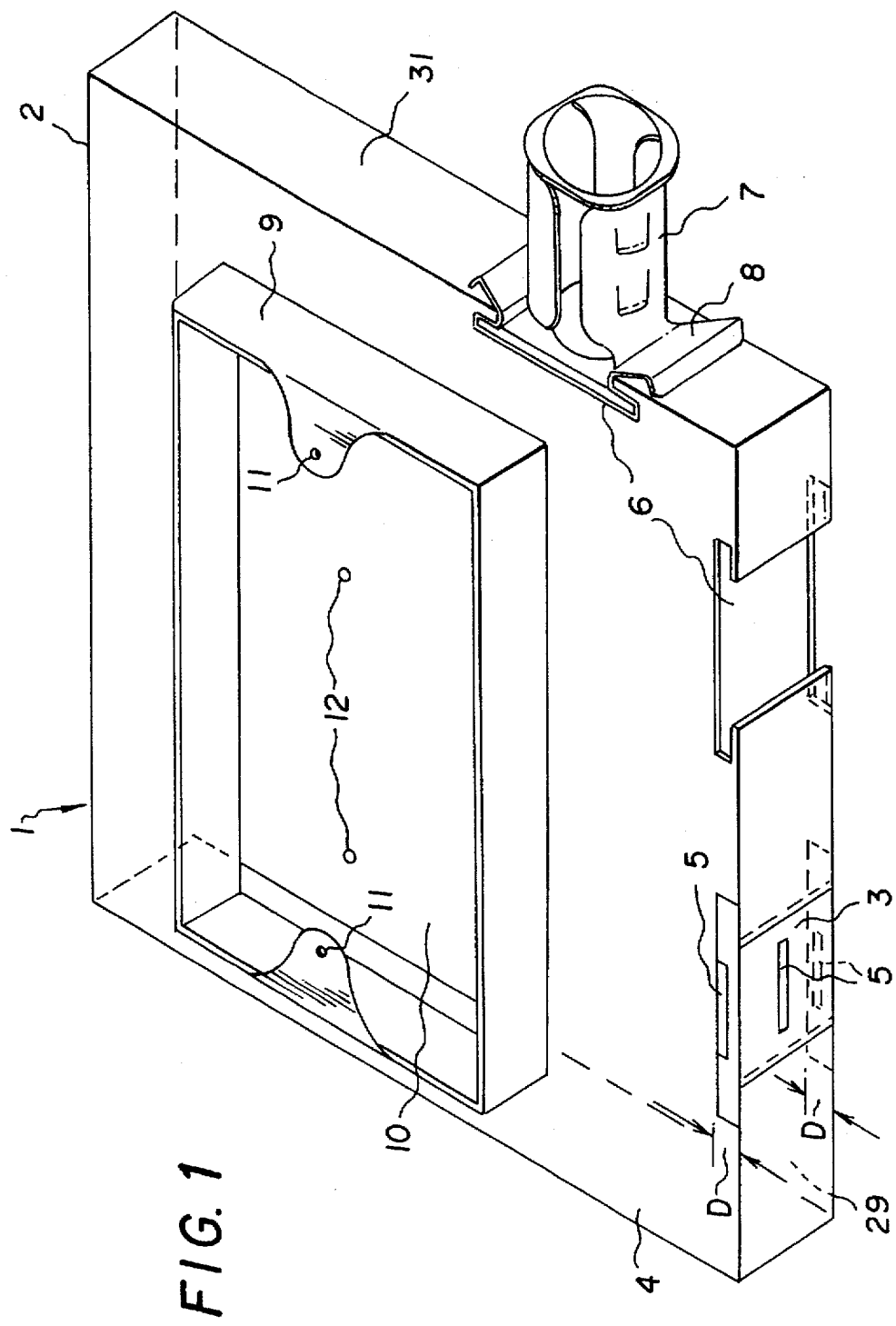
FIG. 1 is a diagramatic, perspective view of a one gang electrical outlet box according to the invention.

Referring now to the figures of the drawing in detail and first, particularly, to FIG. 1 thereof, there is shown a one gang electrical outlet box 1 with a housing 2 as well as knock-outs 3, a wall finishing support top 4 and a side wall 31. The knock-out 3 extends a distance D into the wall finishing support top 4 and the distance D into a back plate 29. Located on the knock-out 3 are a plurality of slots 5, useful for the removal of the knock-out 3. A knock-out cavity 6 is formed when the knock-out 3 is removed. The knock-out cavity 6 is dimensioned to accommodate a connector 7. The connector 7 is shown inserted in the knock-out cavity 6. A flange 8 is located on the connector 7. The flange 8 wedges the connector 7 to the housing 2 of the one gang electrical outlet box 1.

An electrical device housing 9, an electrical device opening 10, a plurality of device mounting ears 11, and a plurality of mounting holes 12 are located on the one gang electrical outlet box 1.

Figure 2:
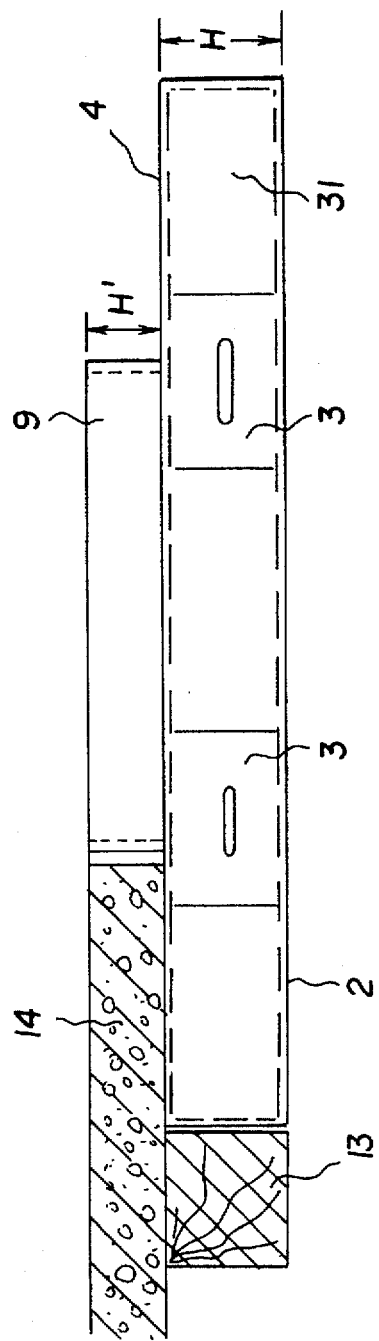
FIG. 2 is a side-elevation view of the one gang electrical outlet box.

FIG. 2 shows that the side wall 31 is dimensioned to a height H such that it fits flushly with a furring strip 13. The electrical device housing 9 is dimensioned to a height H' such that it fits flushly with a wall finishing sheet 14 when the wall finishing sheet 14 is sitting on the wall finishing support top 4. In the preferred application, the depth of H+H' is 1¼" (3.175 cm), whereby the dimension H is ¾" (1.9 cm) which corresponds to the thickness of the furring strip, and the dimension H' is ½" (1.27 cm) which corresponds to the thickness of the wall finishing sheet. The dimensions of the outlet box can be changed to accommodate changes in the dimension of the furring strip or the wall finishing sheet.

Figure 3:
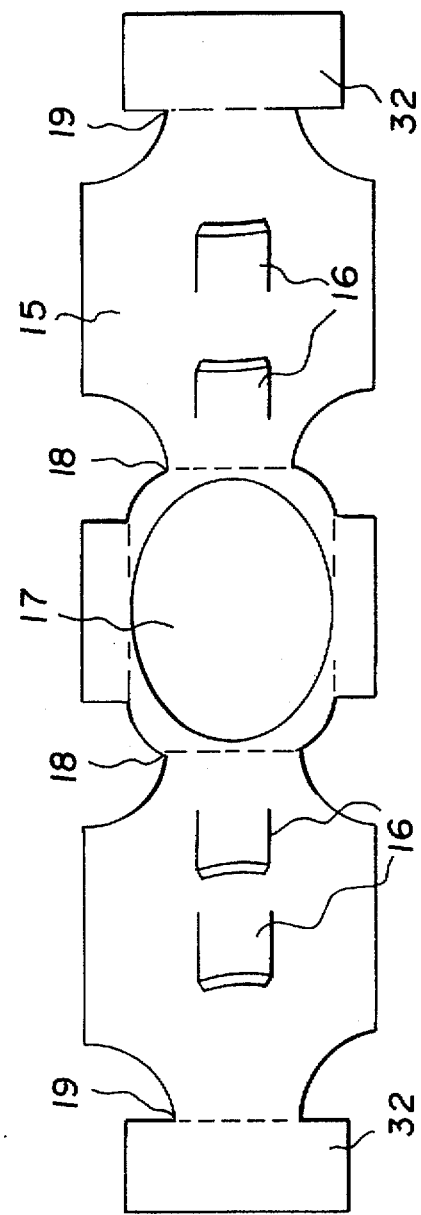
FIG. 3 is a developed view of a stamped top piece of a connector.

FIG. 3 shows a stamped top piece 15 of the connector shown in FIG. 1. The stamped top piece 15 has a plurality of indented dogs 16 which self-engage EMT when the connector is tapped onto the end of the EMT. The center of the stamped top piece 15 has a circular entry 17 for EMT to enter through. The stamped top piece 15 is bent at dashed lines 18 to form the sides of the connector. The stamped top piece 15 is bent at dashed lines 19 to form a pair of bottom support flanges 32 of the connector. Note FIGS. 5 and 6 for a finished view of the connector.

Figure 4:
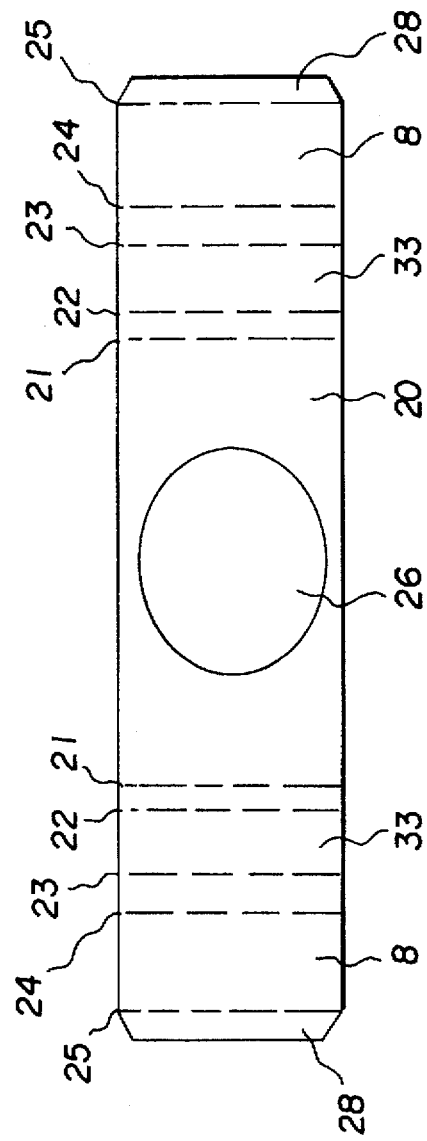
FIG. 4 is a developed view of a stamped, one-piece, base piece or fastener of the connector.

FIG. 4 shows a stamped, one-piece, base piece or fastener 20 of the connector shown in FIG. 1. The base piece or fastener 20 is bent at dashed lines 21, 22, and 23 to form a base wedge cavity 33 to interlock the top piece shown in FIG. 3 and the base piece or fastener 20. The base piece or fastener 20 is bent at dashed lines 24 and 25 to form the flange 8. Note FIGS. 5 and 6 for the finished view of the connector. The center of the base piece or fastener 20 has a circular entry 26 which allows the entry of an electrical conductor into the one gang electrical outlet box shown in FIG. 1. The circular entry 26 is dimensioned to prevent the EMT from entering the one gang electrical outlet box and to provide rounded edges to prevent damage to the conductor insulation.

The base piece or fastener 20 will immobilize the connector to the housing, shown in FIG. 1, without the need of a lock nut to secure the connector to the housing as is required in the prior art.

Figure 5:
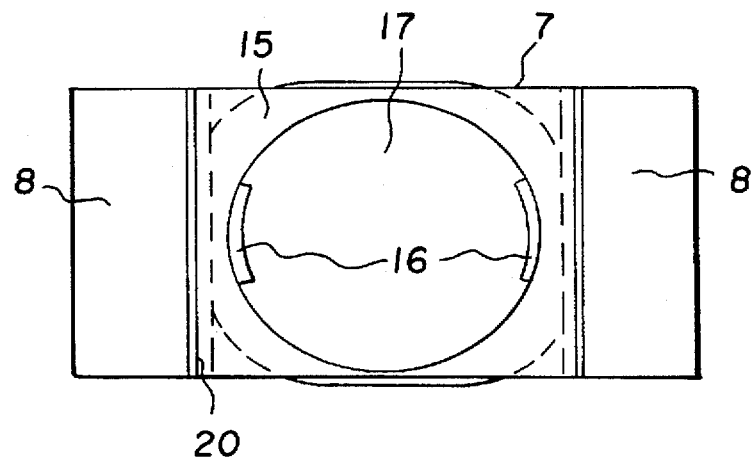
FIG. 5 is an end-elevation view of the assembled connector.

FIG. 5 shows the assembled connector 7. The connector 7 is formed from the top piece 15 and the base piece or fastener 20. The base piece or fastener 20 is further defined by a pair of the flanges 8 which wedge the connector 7 to the housing shown in FIG. 1; note FIG. 9 for an expanded view of the flange 8 wedging the housing. The top piece 15 is further defined by the plurality of indented dogs 16 and a circular entry way 17 for the entry of EMT. The indented dogs 16 secure the EMT in place when the connector is tapped onto the end of a piece of EMT; note FIG. 8 for an expanded view of the indented dogs 16 securing a piece of EMT 27. In addition, the stamped top piece 15 is roll formed to the exterior dimension of the EMT 27 to confine the EMT 27 within the connector 7.

Figure 6:
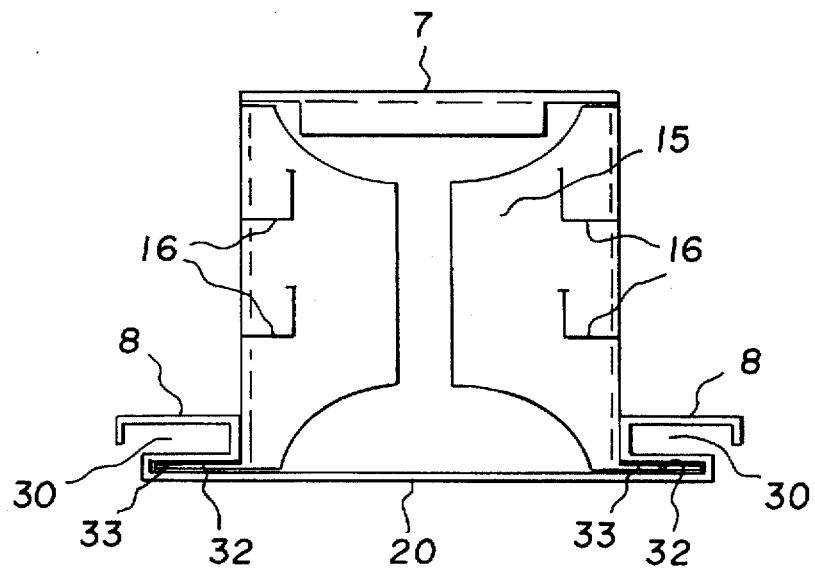
FIG. 6 is a side-elevation, rotated through 90 degrees relative to FIG. 1, of the assembled connector.

FIG. 6 shows another view of the connector 7 which is formed from the top piece 15 and the base piece or fastener 20. The bottom support flanges 32, of the top piece 15, reside in the base wedge cavities 33, of the base piece or fastener 20, for securing the top piece 15 to the base piece or fastener 20. The base piece or fastener 20 has the flange 8 shown in FIGS. 1 and 5. The base piece or fastener 20 also forms a pair of housing receiving chambers 30 which allows the connector 7 to be inserted onto the housing shown in FIG. 1. The top piece 15 has the indented dogs 16 shown in FIGS. 3 and 5.

Figure 7:
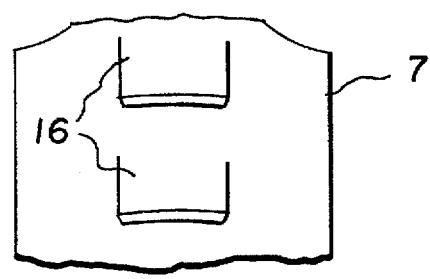
FIG. 7 is a fragmentary, side-elevational view, circumferentially rotated relative to FIG. 6, showing a pair of self-engaging indented dogs located in the connector.

FIG. 7 shows another view of the indented dogs 16 on the connector 7.

Figure 8:
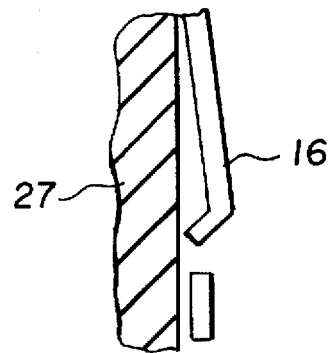
FIG. 8 is a fragmentary, longitudinal-section view of the self-engaging indented dogs securing a piece of EMT.

FIG. 8 shows one of the indented dogs 16 of the connector shown in FIGS. 1, 5 and 6 engaging the wall of the EMT 27. When the connector is tapped onto the end of the EMT 27, the indented dog 16 is forced outward as the EMT 27 enters the connector. The indented dog 16 is made from heat treated spring steel and exerts a counter force on the EMT 27 when the indented dog 16 is forced outward by the EMT 27.

Figure 9:
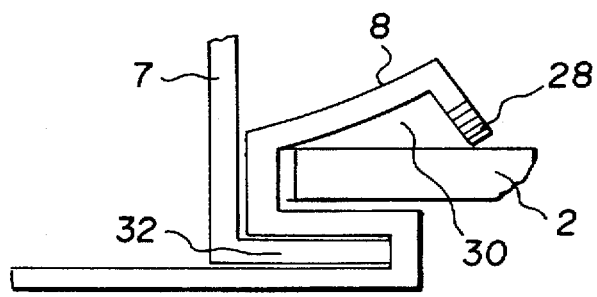
FIG. 9 is an enlarged, fragmentary, side-elevational view of a self-engaging flange, located on the connector, wedged against the one gang electrical outlet box.

FIG. 9 shows the flange 8, of the connector 7, wedging the housing 2 of the one gang electrical outlet box shown in FIG. 1. The wedging force exerted by the flange 8, holds the connector 7 to the one gang electrical outlet box. The flange 8 of the connector 7 is pressed outward when the connector 7 is inserted into the knock-out cavity shown in FIG. 1. Ends of a flange ear 28 are rounded in shape and this assists in the entry of the connector 7 into the knock-out cavity. The housing 2 sits in the housing receiving chamber 30 of the connector 7. The flange 8 is made from heat treated spring steel which provides the wedging force.

I claim:

1. An electrical outlet box and connector assembly, comprising;

an outlet box housing having a plurality of cavities formed therein;

said outlet box housing having a wall finishing support top and a side wall and, one of said cavities being formed of a slot in said wall finishing support top and a slot in said side wall; and a connector having a one-piece fastener for immobilizing said connector with said connector mounted in said one of said cavities.

2. The electrical outlet box and connector assembly according to claim 1, wherein said outlet box housing has a back plate and said one of said cavities is further formed of a slot in said back plate into which said connector is slid.

3. The electrical outlet box and connector assembly according to claim 1, including a plurality of removable knock-outs mounted on said outlet box housing and covering said cavities.

4. The electrical outlet box and connector assembly according to claim 3, wherein said knock-outs are rectangular in shape.

5. The electrical outlet box and connector assembly according to claim 1, wherein said connector has a plurality of indented dogs for securing said connector to electrical metallic tubing.

6. The electrical outlet box and connector assembly according to claim 5, wherein said indented dogs are made from heat treated spring steel for gripping the electrical metallic tubing.

7. The electrical outlet box and connector assembly according to claim 1, wherein said fastener has a flange for securing said connector to said outlet box housing.

8. The electrical outlet box and connector assembly according to claim 7, wherein said fastener has a chamber bordered by said flange for receiving a portion of said outlet box housing.

9. The electrical outlet box and connector assembly according to claim 7, wherein said flange is made from heat treated spring steel for gripping said outlet box housing.

10. The electrical outlet box and connector assembly according to claim 7, wherein said flange has rounded edges for facilitating entry of said connector into said one of said cavities.

11. The electrical outlet box and connector assembly according to claim 1, wherein said outlet box housing has a given depth corresponding to a sum of a thickness of a furring strip and of a wall finishing sheet for facilitating installation of the wall finishing sheet and said outlet box housing placed between furring strips on a masonry wall.

* * * * *